(12) United States Patent
Weksler et al.

(10) Patent No.: US 9,606,973 B2
(45) Date of Patent: Mar. 28, 2017

(54) INPUT CORRECTION ENHANCEMENT

(71) Applicant: Lenovo (Singapore) Pte. Ltd., Singapore (SG)

(72) Inventors: Arnold S. Weksler, Raleigh, NC (US); Russell Speight VanBlon, Raleigh, NC (US); Neal Robert Caliendo, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 277 days.

(21) Appl. No.: 14/261,923

(22) Filed: Apr. 25, 2014

(65) Prior Publication Data

US 2015/0310095 A1    Oct. 29, 2015

(51) Int. Cl.
*G06F 17/24*    (2006.01)
*G06F 3/0484*   (2013.01)
*G06F 17/27*    (2006.01)

(52) U.S. Cl.
CPC .......... *G06F 17/24* (2013.01); *G06F 3/04842* (2013.01); *G06F 17/273* (2013.01)

(58) Field of Classification Search
CPC .............................. G06F 17/24; G06F 3/04842
See application file for complete search history.

(56) References Cited

U.S. PATENT DOCUMENTS

| | | | | |
|---|---|---|---|---|
| 2002/0065828 A1* | 5/2002 | Goodspeed | ....... | G06F 17/30887 |
| 2003/0009439 A1* | 1/2003 | Lee | ....... | G06F 17/3089 |
| 2007/0016862 A1* | 1/2007 | Kuzmin | ....... | G06F 3/0236 715/700 |
| 2011/0161829 A1* | 6/2011 | Kristensen | ....... | G01C 21/3611 715/739 |
| 2012/0079373 A1* | 3/2012 | Kocienda | ....... | G06F 3/0237 715/261 |
| 2012/0206367 A1* | 8/2012 | Griffin | ....... | G06F 3/0237 345/169 |
| 2012/0304100 A1* | 11/2012 | Kocienda | ....... | G06F 3/0237 715/773 |
| 2013/0212515 A1* | 8/2013 | Eleftheriou | ....... | G06F 3/04886 715/773 |
| 2014/0040733 A1* | 2/2014 | Colley | ....... | G06F 3/0237 715/256 |

* cited by examiner

*Primary Examiner* — William Spieler
(74) *Attorney, Agent, or Firm* — Ference & Associates LLC

(57) ABSTRACT

An embodiment provides a method, including: receiving, at an input device, user input having a string of characters; determining, using a processor, one or more potential errors in the string of characters; identifying, using a processor, a character location of a highest ranked error of the one or more potential errors within the string of characters; and positioning, on a display, a visual indication associated with the location of the highest ranked error within the string of characters. Other aspects are described and claimed.

18 Claims, 4 Drawing Sheets

INPUT CORRECTION ENHANCEMENT

BACKGROUND

Various user input devices allow users to input data using a variety of modalities, e.g., keyboards used for typing, microphones and speech recognition systems used for voice input, touch screens used for touch input, etc. Users often make mistakes when inputting data or otherwise desire to make changes to the input that is entered.

Making changes to user input, e.g., changing a word spelling derived from touch input to a touch screen, requires the user to touch the location of the letter (or letters) that need to be modified. Very often, letters in close proximity to the actual desired letters are erroneously highlighted when using a touch interface, e.g., when using a finger tip to indicate a location where input is to be modified.

BRIEF SUMMARY

In summary, one aspect provides a method, comprising: receiving, at an input device, user input having a string of characters; determining, using a processor, one or more potential errors in the string of characters; identifying, using a processor, a character location of a highest ranked error of the one or more potential errors within the string of characters; and positioning, on a display, a visual indication associated with the character location of the highest ranked error within the string of characters.

Another aspect provides an apparatus, comprising: a display; an input device; a processor operatively coupled to the at least one input device and the display; and a memory storing instructions that are executable by the processor to: receive, at the input device, user input having a string of characters; determine one or more potential errors in the string of characters; identify a character location of a highest ranked error of the one or more potential errors within the string of characters; and position, on the display, a visual indication associated with the character location of the highest ranked error within the string of characters.

A further aspect provides a product, comprising: a computer readable storage device storing code therewith, the code being executable by a processor and comprising: code that receives user input having a string of characters; code that determines one or more potential errors in the string of characters; code that identifies a character location of a highest ranked error of the one or more potential errors within the string of characters; and code that positions, on a display, a visual indication associated with the character location of the highest ranked error within the string of characters.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
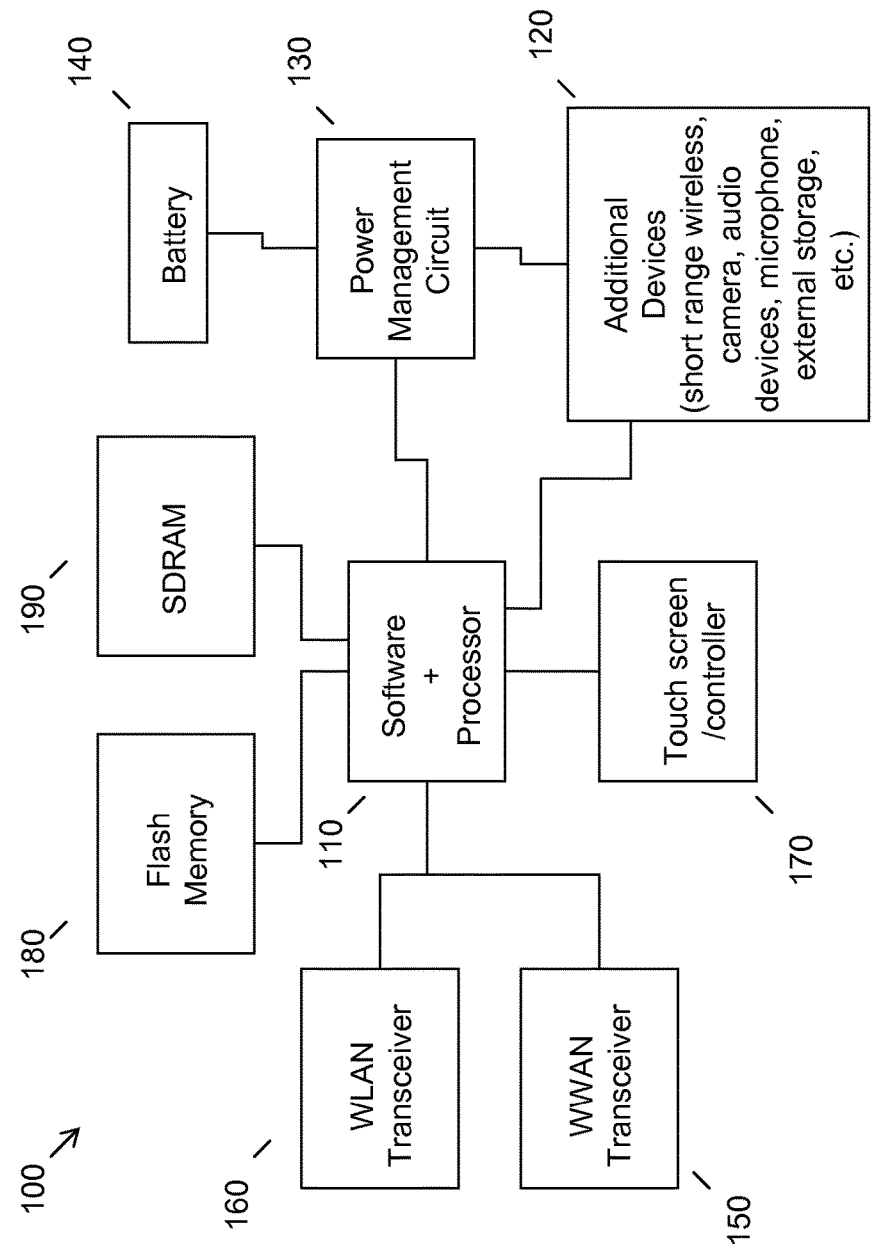
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described herein, if a user would like to modify or change input provided to a system, particularly when using a touch based interface, additional touches to hit or select the correct location within the word is often required. Often a user will need to use a handle associated with the cursor to move to the location of the desired letter. This can be time consuming and frustrating for a user.

Accordingly, an embodiment provides a method of input correction enhancement whereby character-level feedback is provided, and the character location may be determined via a statistical analysis to provide the most-likely character locations of potential errors. This facilitates a refined positioning of the cursor or indication, which may be useful, e.g., when user is providing touch input to a touch screen with his or her finger.

In an example embodiment, user input having a string of characters, e.g., letters forming words, phrases, acronyms, etc., is received, e.g., at a touch screen display. An embodiment may determine one or more potential errors in the string of characters. For example, a misspelled word may be identified including the particular letter or letters that are incorrect or another type of input formed by the characters may be analyzed to identify potential error(s). For example, in a telephone number, a missing input of an area code may be identified as a potential error. In at least one embodiment, repeated user inputs may be used to identify a potential error and thus provide an updated indication thereof, e.g., repeated user inputs such as cursor repositioning inputs may be used by an embodiment to intelligently reposition the cursor based on an analysis of the initial input.

An embodiment may therefore identify a character location having a highest ranked error of the one or more potential errors within the string of characters, e.g., based on a linguistic analysis or the like. Based on a character level identification of the potential error and statistical identification of the most likely position thereof, an embodiment may position, e.g., on the touch screen display, a visual indication at the character location of the highest ranked error within the string of characters. This may include, for example, initially highlighting a character or placing a cursor at a character location likely to be involved with the error. This may also include, additionally or alternatively, repositioning of an indicator, e.g., a cursor, that was initially placed based on user touch input. For example, a cursor or like indicator may be repositioned based on a user repeatedly providing input, e.g., attempting to reposition the cursor through touch input.

For example, when the user touches a word that is in need of modification, the letter that is highlighted by an embodiment would be the statistically best letter, e.g., based on a linguistic analysis such as consulting a dictionary (personal and general) and/or other data sources. If the user touches the same word again (i.e., repeated or additional input associated with the character string), then the next best statistically used letter may be highlighted. Additional touches of the same word may then move the visual indication sequentially and highlight the next best letter until the letter desired is selected.

In such a scenario where a sequential repositioning is implemented, the location of the visual indication may include a statistical letter weighting that may also take into account proximity of touch, e.g., in combination with consultation of a user dictionary. The location of the visual indication may also include a statistical letter weighting using letters on the keyboard in close proximity to the potentially incorrect letter that would make a valid word/phrase. For example, nearby letters would be used to determine more likely letter positions.

The illustrated example embodiments will be best understood by reference to the figures. The following description is intended only by way of example, and simply illustrates certain example embodiments.

While various other circuits, circuitry or components may be utilized in information handling devices (also referred to herein as apparatuses, electronic devices, or simply devices), with regard to smart phone and/or tablet circuitry 100, an example illustrated in FIG. 1 includes a system on a circuit design found for example in tablet or other mobile computing platforms. Software and processor(s) are combined in a single circuit 110. Processors comprise internal arithmetic units, registers, cache memory, busses, I/O ports, etc., as is well known in the art. Internal busses and the like depend on different vendors, but essentially all the peripheral devices (120) may attach to a single circuit 110. The circuitry 100 combines the processor, memory control, and I/O controller hub all into a single circuit 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single circuit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a touch screen 170 for data input and display/rendering. System 100 also typically includes various memory devices, for example flash memory 180 and SDRAM 190.

Figure 2:
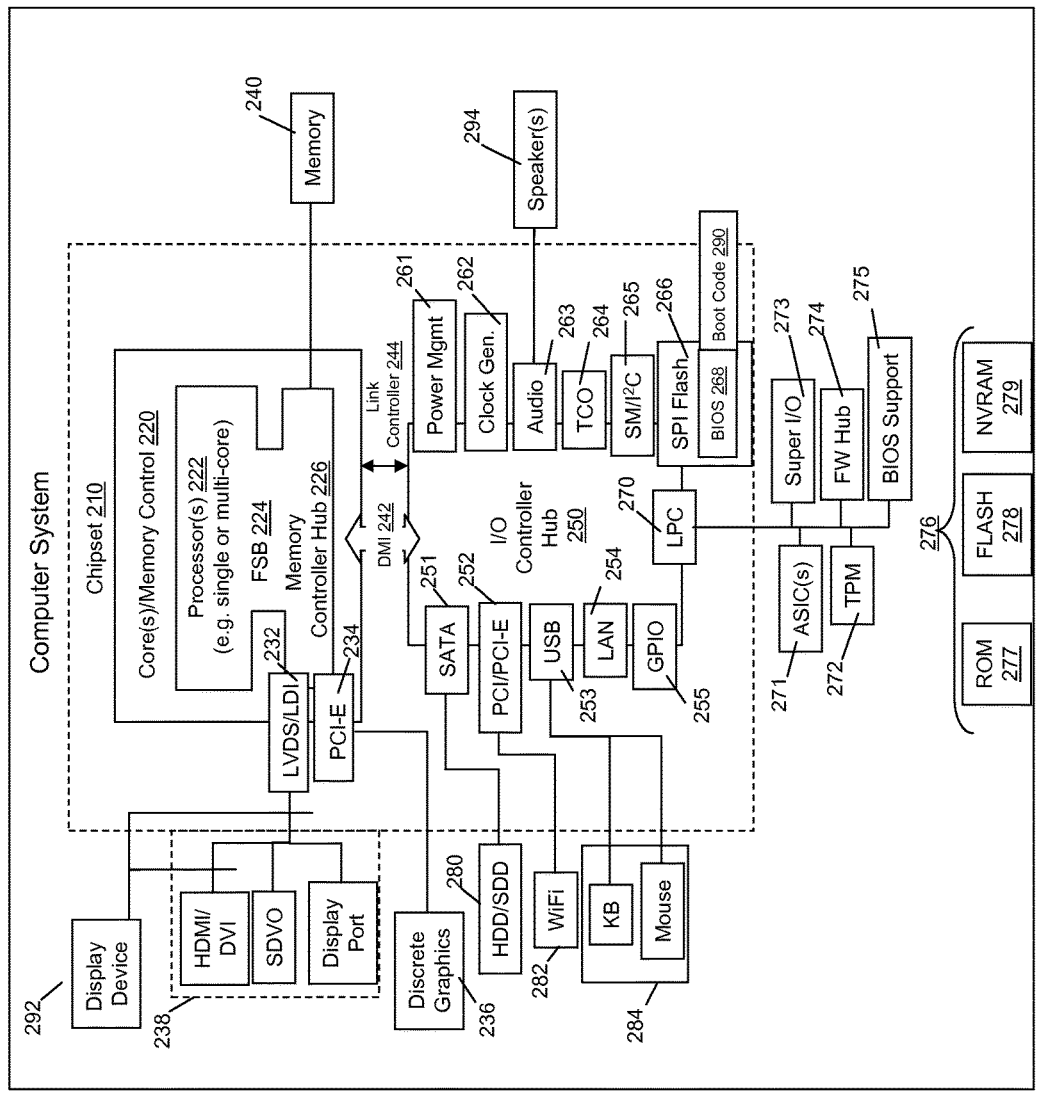
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Circuitry, as for example outlined in FIG. 1 or FIG. 2, may be used in devices that provide a user interface such as a touch input interface. For example, devices including some or all of the circuitry illustrated in FIG. 1 and/or FIG. 2 may include a touch screen and controlling logic that takes user input and renders the same on the touch screen display.

Figure 3:
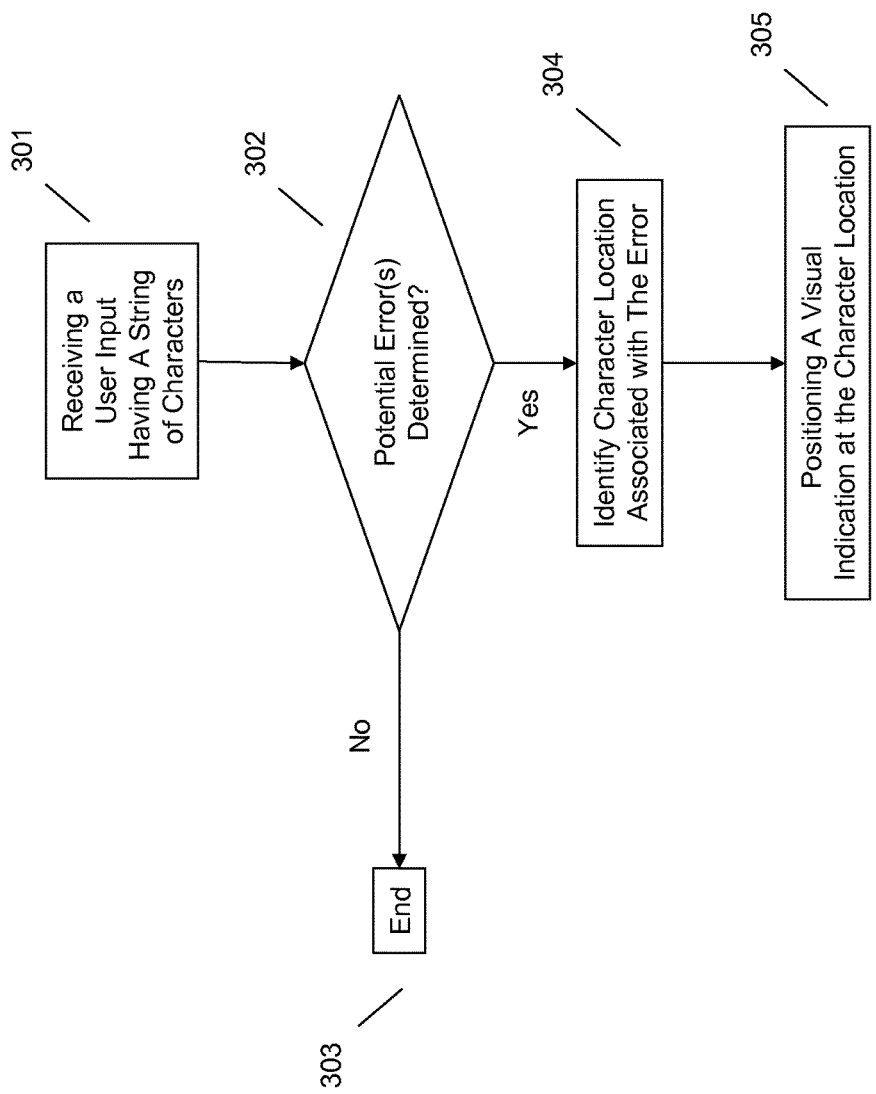
FIG. 3 illustrates an example method of input correction enhancement.

Referring to FIG. 3, an embodiment may receive 301, at an input device such as touch screen, user input having a string of characters. For example, a string of characters may include a series of numbers, letters or other symbols forming a unit. Thus, a string of characters may include letters forming one or more words, with words being defined broadly to include words, phrases, acronyms, abbreviations, slang terms, colloquialisms, and the like, such as may be stored in a personalized dictionary. Likewise, a series of numbers may form a telephone number, a house number, etc. Other symbols may be included, for example "@" symbols used in email addresses, punctuation and other symbols, e.g., emoticons.

An embodiment may, after a user inputs a string of characters at 301, determine one or more potential errors in the string of characters at 302. The potential error(s) may be determined at 302 in a variety of ways and at a variety of times. For example, an embodiment may analyze the string of characters initially, i.e., prior to any further user input, e.g., akin to a spell checking function or a grammar checking function. Alternatively, or in addition to this initial checking, an embodiment may analyze the string of characters following or in connection with additional user inputs, e.g., repeated user touch inputs associated with the string of characters, as may occur when the user attempts to reposition a cursor to correct an error or otherwise modify the string of characters. It is worth noting here that a potential error may or may not include a literal error, but may include more generally any modification to the character string.

An embodiment may thus identify a character location associated with the potential error(s) at 304, e.g., a highest ranked error. If no errors are present, the process may end at 303.

In an embodiment, an error indicated as primary or having a highest rank may be visually indicated at 305, e.g., highlighted specifically within the string of characters, or visually indicated by placing the cursor at this location. This positioning at 305, e.g., on the touch screen display, of a visual indication at the character location of the highest ranked error within the string of characters may take place at a variety of times and may be based on a ranking that takes into account a variety of variables.

For example, an initial positioning of the visual indication may take place based on an analysis of the initial character input, e.g., a linguistic analysis of the letters forming the character sting. As another example, the positioning may be a repositioning, e.g., triggered by additional or repeated touch inputs provided by the user in an attempt to refine the position or highlighting of a cursor within the string of characters. This repositioning may be based on a sequential repositioning or ordering based on another analysis, e.g., a linguistic analysis and/or a field based analysis.

Thus, for example, an embodiment may choose a location for the visual indication, e.g., based on a ranking of potential locations, responsive to a user's touch input. This may be preferable to simply attempting to reposition the visual indication based on the touch input alone, as the user is signifying dissatisfaction with the location by virtue of providing the repeated input, i.e., the repeated input itself aids in the determination that there is a potential error and the identification of another location for the repositioning. Thus, the determining of one or more potential errors at 302 in the string of characters may occur after a user provides input associated with the string of characters.

Figure 4:
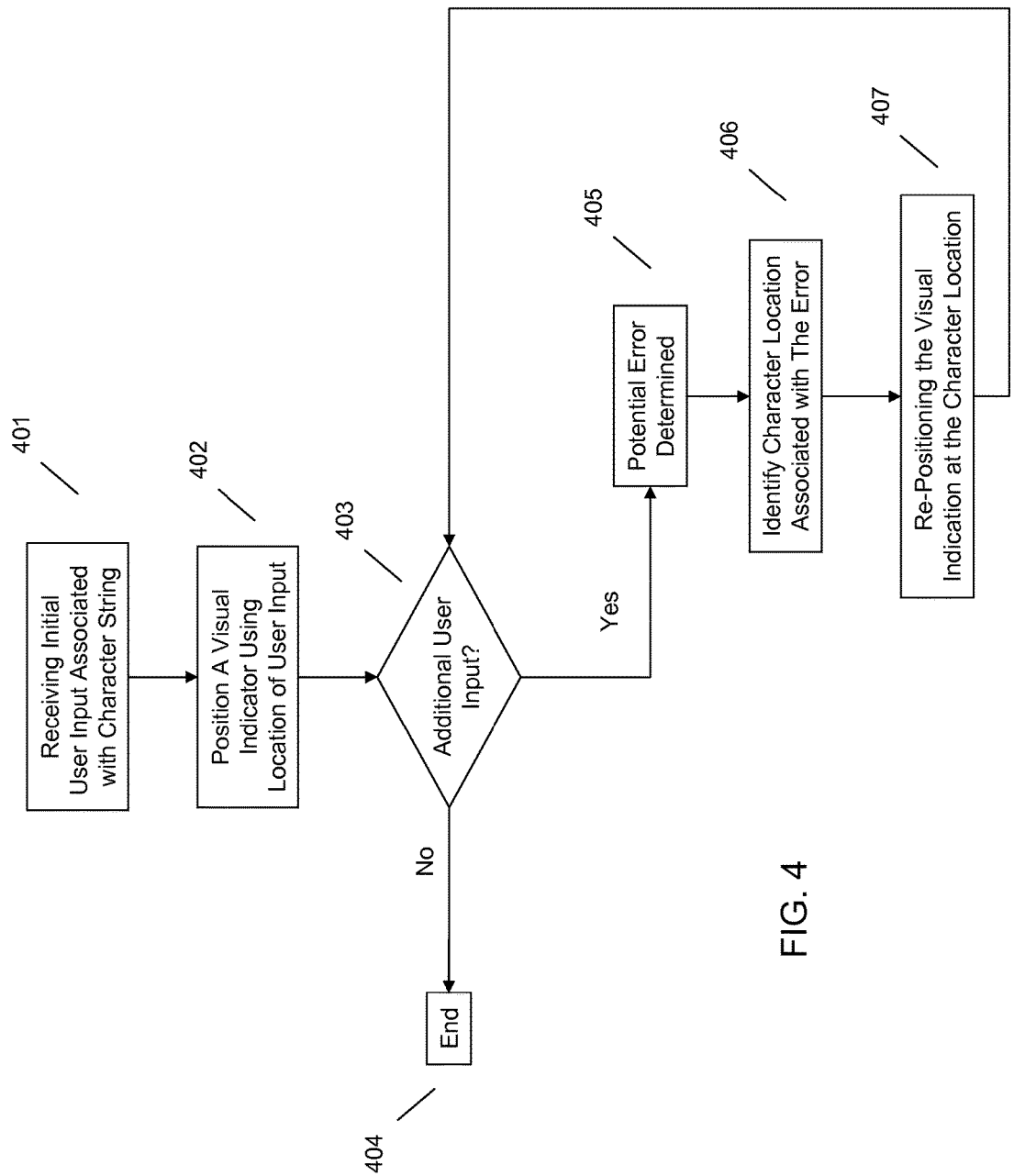
FIG. 4 illustrates another example method of input correction enhancement.

For example, referring to FIG. 4, an embodiment may detect an initial input provided by the user and associated with the string of characters at 401, such as a touch input to a word that needs to be modified. An embodiment may provide an initial visual indication responsive to user input without determining one or more potential errors in the string of characters at 402, e.g., on the basis of touch location alone. An embodiment may thereafter detect an additional input at 403, e.g., provided by the user and associated with the string of characters, such as an additional touch input to a word that needs to be modified. This signifies that the user is not satisfied with the original location chosen based on touch input. If no additional user input is detected at 403, then the process may end at 404.

An embodiment may determine at 405 the potential error, e.g., on the basis of the additional user input alone and/or in combination with a more detailed analysis, e.g., linguistic analysis or field based analysis, such that a character location associated with the error may be identified at 406. By way of example, in an embodiment, a character location may be identified that is different from the touch based location used for positioning at 402, where this different location may be based on some analysis with respect to the character string, e.g., its contents, and/or the field or context in which it is provided. Thus, for a character string such as a telephone number which lacks an area code input, an embodiment may determine at 405 that a potential error is the omission of the area code input, which would be the leading character(s) of the string. Thus the character location identified at 406 may be based on a field analysis, i.e., the field of character input is a telephone number field, such that a location identified at 406 may be appropriately chosen.

Accordingly, the visual indication positioned at the location of the highest ranked error within the string of characters comprises a re-positioned initial visual indication, which is provided at 407, such as one based on taking into account the initial user input, a field in which the characters have been input, the string of characters themselves (e.g., linguistic analysis), etc.

In an embodiment, identifying a character location of a highest ranked error of one or more potential errors, whether determined initially or responsive to repeated or additional user input, may include identifying one or more words and analyzing these one or more words using a linguistic analysis tool to determine one or more potential errors, as well as identifying a character location in the string of characters associated with the location of the highest ranked error of these one or more potential errors. The highest ranked error of these one or more potential errors may be identified using a variety of methods such as a user history of errant input, and repeated user input associated with the string of characters. As described here, the identifying of a character location of a highest ranked error of one or more potential errors may proceed sequentially through potential error character locations, which may itself proceed responsive to repeated user input associated with the string of characters. Thus, the cursor or highlighted character may sequentially progress through a ranked order of positions determined to be relevant to one or more potential errors or modifications of the user input.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a touch input device, user input of a string of characters;
   prior to receiving user input to the string of characters, determining, using a processor, one or more potential errors in the string of characters;
   identifying, using a processor, a character location of the one or more potential errors within the string of characters; and
   automatically positioning, on a display, a visual indication associated with the character location of the one or more potential errors within the string of characters.

2. The method of claim 1, further comprising:
   detecting an initial input provided by the user and associated with the string of characters, wherein a cursor is initially located at an end of the string of characters;
   automatically re-positioning the cursor responsive to the initial input without determining one or more potential errors in the string of characters; and
   detecting an additional input provided by the user and associated with the string of characters after the cursor has been re-positioned in response to the initial input;
   wherein the visual indication associated with the location of the one or more potential errors within the string of characters comprises an automatically re-positioned cursor that is moved after the additional user input.

3. The method of claim 1, wherein the identifying a character location of the one or more potential errors comprises:
   identifying one or more words;
   analyzing the one or more words using a linguistic analysis tool to determine the one or more potential errors; and
   identifying a character location in the string of characters associated with the location of the one or more potential errors.

4. The method of claim 3, wherein the one or more potential errors is identified using at least one of a user history of errant input, and repeated user input associated with the string of characters.

5. The method of claim 1, wherein the identifying a character location of the one or more potential errors proceeds sequentially through potential error character locations responsive to repeated user input associated with the string of characters.

6. The method of claim 5, wherein sequential error locations are visually indicated responsive to repeated user input associated with the string of characters.

7. The method of claim 1, wherein identifying a location of the one or more potential errors within the string of characters comprises identifying an error based on a character string type.

8. The method of claim 7, wherein the character string type is identified in response to contact input to a field of an application.

9. The method of claim 1, wherein the touch input device comprises a touch sensitive surface.

10. An apparatus, comprising:
a display;
a touch input device;
a processor operatively coupled to the touch input device and the display; and
a memory storing instructions that are executable by the processor to:
receive, at the touch input device, user input of a string of characters;
prior to receiving user input to the string of characters, determine one or more potential errors in the string of characters;
identify a character location of the one or more potential errors within the string of characters; and
automatically position, on the display, a visual indication associated with the character location of the one or more potential errors within the string of characters.

11. The apparatus of claim 10, wherein the instructions are further executable by the processor to:
detect an initial input provided by the user and associated with the string of characters, wherein a cursor is automatically located at an end of the string of characters;
automatically re-positioning the cursor responsive to the initial input without determining one or more potential errors in the string of characters; and
detect an additional input provided by the user and associated with the string of characters after the cursor has been re-positioned in response to the initial input;
wherein the visual indication associated with the location of the one or more potential errors within the string of characters comprises an automatically re-positioned cursor that is moved after the additional user input.

12. The apparatus of claim 10, wherein to identify a character location of the one or more potential errors comprises:
identifying one or more words;
analyzing the one or more words using a linguistic analysis tool to determine the one or more potential errors; and
identifying a character location in the string of characters associated with the location of the highest ranked error of the one or more potential errors.

13. The apparatus of claim 12, wherein the one or more potential errors is identified using at least one of a user history of errant input, and repeated user input associated with the string of characters.

14. The apparatus of claim 10, wherein the character location of the one or more potential errors is identified sequentially through potential error character locations responsive to repeated user input associated with the string of characters.

15. The apparatus of claim 14, wherein sequential error locations are visually indicated responsive to repeated user input associated with the string of characters.

16. The apparatus of claim 10, wherein a location of the one or more potential errors within the string of characters is identified based on a character string type.

17. The apparatus of claim 16, wherein the character string type is identified as contact input to a field of an application.

18. A product, comprising:
a computer readable storage device storing code therewith, the code being executable by a processor and comprising:
code that receives, at a touch input device, user input of a string of characters;
code that determines, prior to receiving user input to the string of characters, one or more potential errors in the string of characters;
code that identifies a character location of the one or more potential errors within the string of characters; and
code that automatically positions, on a display, a visual indication associated with the character location of one or more potential errors within the string of characters.

* * * * *